July 31, 1923.

E. G. THOMAS 1,463,450

RECORDING SCALE

Filed March 29, 1918

Witnesses
A. H. Lybrand

Inventor
Edward G. Thomas
George K. Frye
By
Attorney

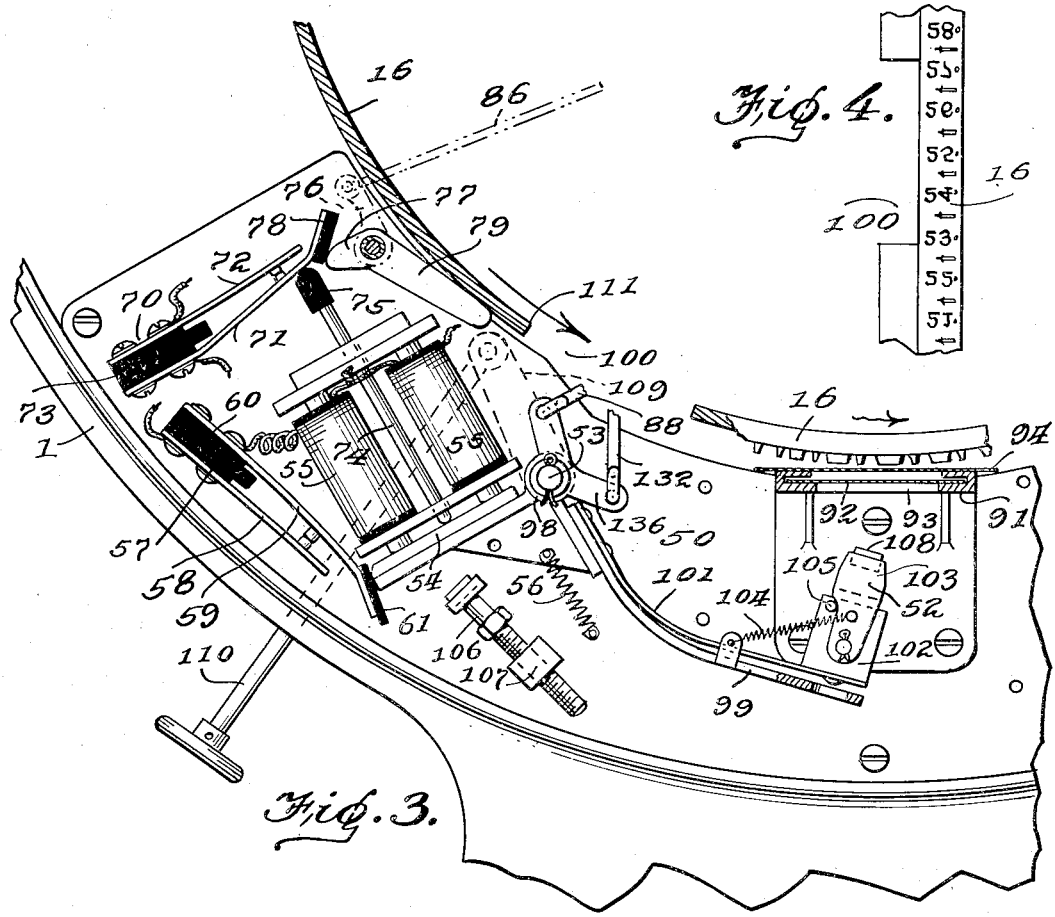
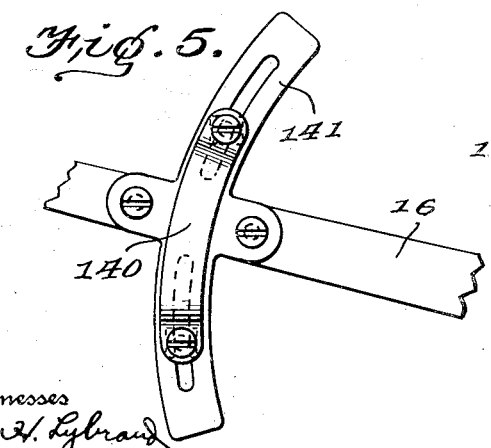
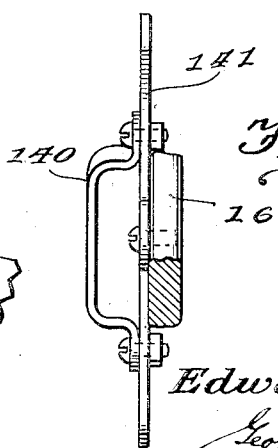

July 31, 1923.
E. G. THOMAS
RECORDING SCALE
Filed March 29, 1918
1,463,450
4 Sheets-Sheet 3
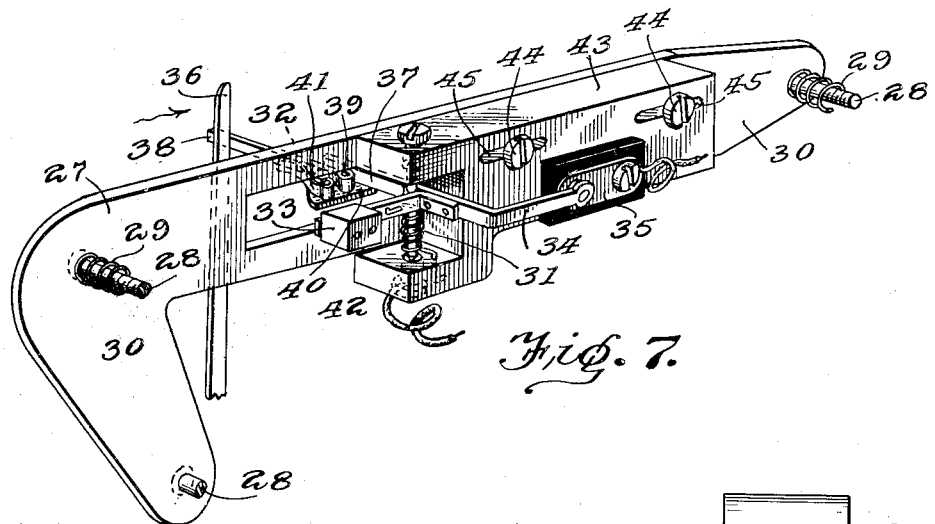
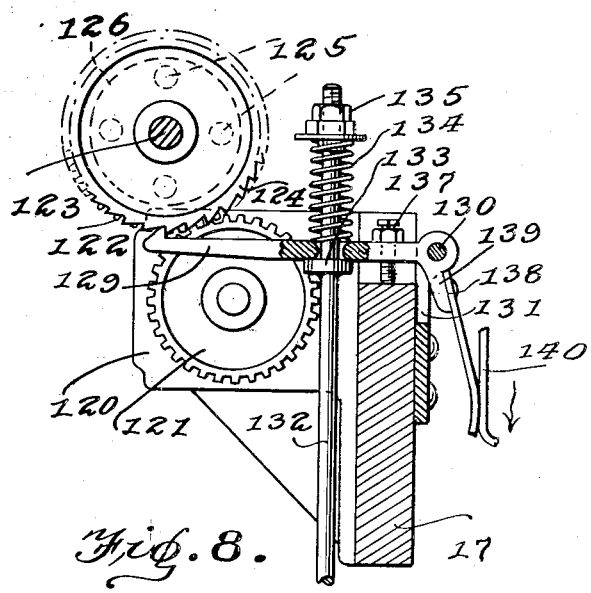
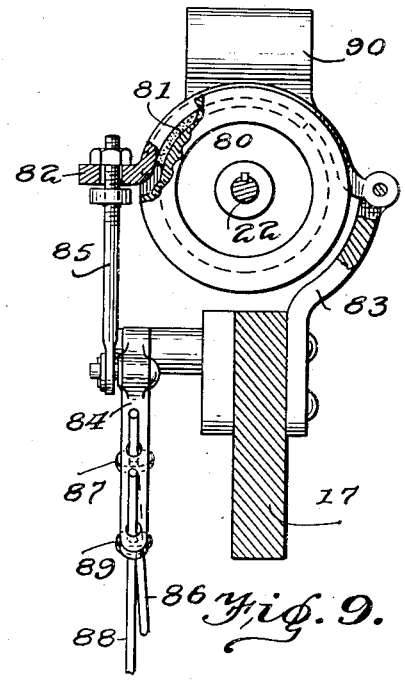
Inventor
Edward G. Thomas July 31, 1923.
E. G. THOMAS
1,463,450
RECORDING SCALE
Filed March 29, 1918
4 Sheets-Sheet 4
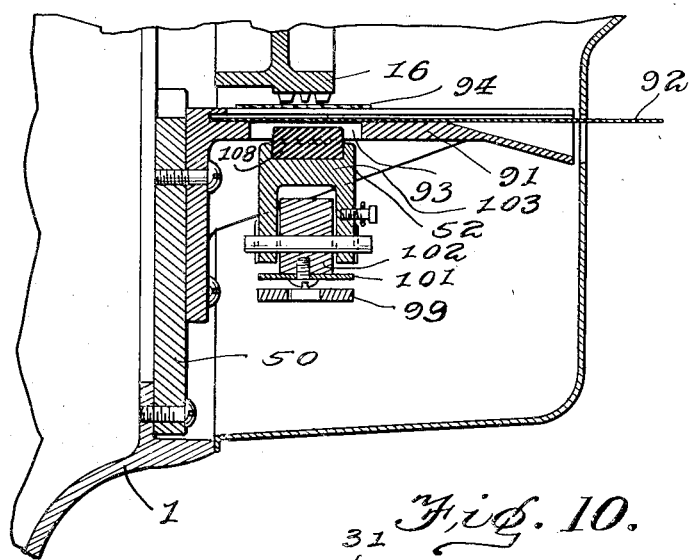
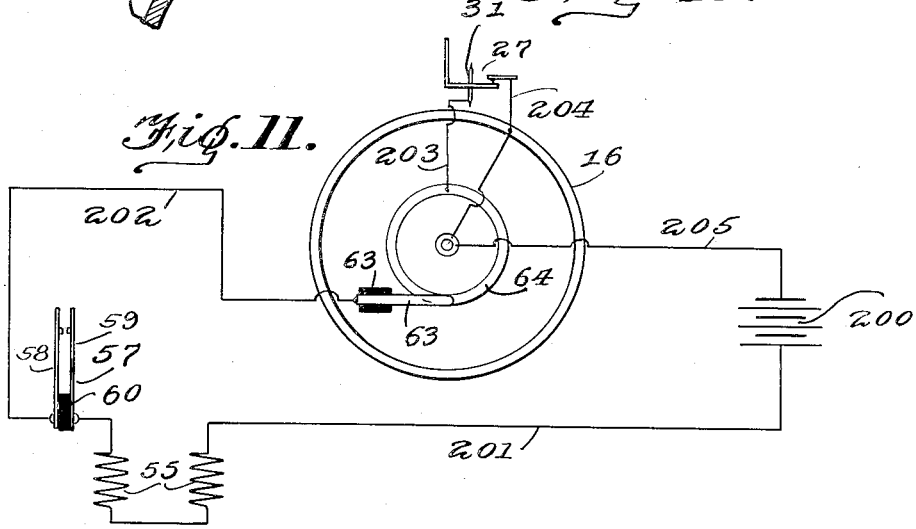
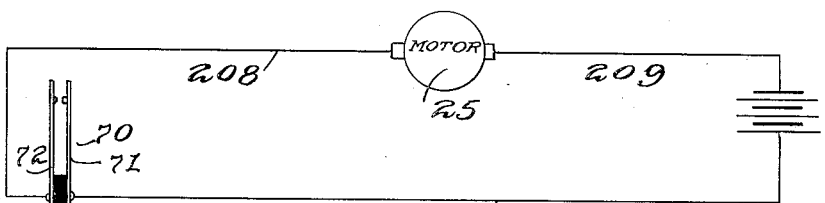
Inventor
Edward G. Thomas
Witnesses
By
Attorney Patented July 31, 1923.

1,463,450

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

RECORDING SCALE.

Application filed March 29, 1918. Serial No. 225,478.

*To all whom it may concern:*

Be it known that I, EDWARD G. THOMAS, a citizen of the United States, residing at Toledo, in the county of Lucas and State of Ohio, have invented certain new and useful Improvements in Recording Scales, of which the following is a specification.

My invention relates to recording scales and more particularly to improvements in the recording mechanism thereof, and provides means for obtaining a printed record of each individual weight and an indication of the total amount of a number of consecutive weighings. The device as herein shown is arranged to be applied to the weighing mechanism of a well-known type of scale employing pendulums as its weight-offsetting elements, and can be applied thereto without interfering with the ordinary use of the scale for obtaining visual indications of the weights of commodities placed upon the scale platform. It is to be understood, however, that this weighing mechanism is merely exemplative and other forms of weighing mechanism can readily be employed.

With the above and other objects in view which will readily appear as the invention is better understood, my invention consists of the novel construction, combination and arrangement of parts to be hereinafter more fully described and particularly pointed out in the appended claims.

Reference is to be had to the accompanying drawings illustrating a preferred embodiment of my invention and wherein similar reference numerals designate similar parts throughout the several views.

In the drawings:—

Fig. 3 is an enlarged detail view of the switch setting means and adjacent mechanism;

Fig. 4 is a detail view of a portion of the type wheel;

Fig. 5 is a detail plan view of the adjustable cam hereinafter referred to;

Fig. 6 is a side elevation thereof;

Fig. 7 is an isometric view on an enlarged scale of a contact mechanism which controls the operation of the printing mechanism;

Fig. 8 is a detail view of the detent controlling the motion of the counting mechanism;

Fig. 9 is a detail view showing the braking mechanism controlling the motion of the type wheel and associated parts;

Fig. 10 is a detail sectional view showing the normal positions of the type wheel, ink ribbon, card holder, and printing hammer;

Fig. 11 is a diagrammatic view of the controlling electrical circuit of the device; and Fig. 12 is a diagrammatic view of the motor circuit.

Figure 1:
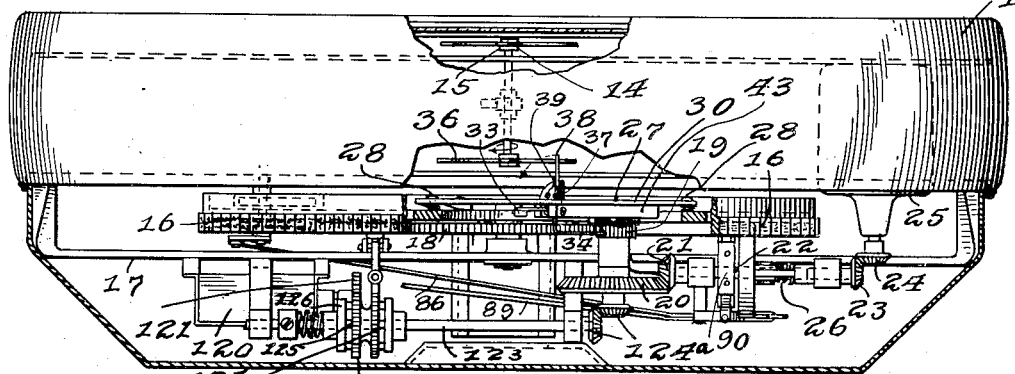
Fig. 1 is a plan view of the scale head with my recording device attached, with parts broken away to show the interior mechanism.

My apparatus may be in its broadest sense described as a means for electrically restraining a printing hammer, with means for rotating a circuit breaker in the circuit of the electrical restraining means into engagement with a member movable with the scale mechanism, causing the release of the printing hammer to produce on a recording surface an impression from a type wheel having simultaneous rotation with the circuit breaker.

A scale head casing 1 contains a pendulum-operated weight-offsetting mechanism, which consists of a frame 2 on which pendulums 3 and 4 are supported by ribbons 5 and 6 attached at their upper ends to the frame 2 and at their lower ends to sectors 7 and 8 of the pendulums. Ribbons 9 and 10 transmit the pull of the draft rod 11 to larger central sectors 12 and 13 attached to the sectors 7 and 8. The pendulums 3 and 4 swing outwardly to resist increments of weight upon the draft rod and their motion is transmitted to a pointer 14 pivotally mounted at 15 in such a manner as to rotate the indicator 14 to graduations upon the scale dial 15 corresponding to the weight of a commodity causing the pull upon the draft rod 11. This apparatus forms a well-known commercial scale mechanism which is not part of this invention and is not claimed in this application.

A type wheel 16 is rotatably mounted in a bracket 17 secured to the casing 1 so that its axis of rotation is in line with the axis of rotation of the pointed 14. A gear wheel 18 is secured to the printing wheel 16 and engages the pinion 19 secured to a shaft carrying the bevel wheel 20. The pinion 21 on the shaft 22 gears with the bevel wheel 20 and shaft 22 through bevel gears 23, 24 is connected to the shaft of a motor 25 by which the apparatus is driven. A fly ball governor 26 may be secured to the shaft 22 to control the maximum speed of the motor 25 in order to secure rotation of the type wheel at a desired uniform rate.

The circuit breaker 27 is mounted upon the type wheel 16 by means of studs 28 and is resiliently spaced centrally of the type wheel and the heads of the studs 28 so as to prevent the transmission of shocks from the mechanism to the circuit breaker. The circuit breaker consists of a supporting plate 30 carrying an adjustable supporting bracket 43 upon which is pivoted a shaft 31 carrying a series of arms 32, 33 and 34. The arm 34 is arranged to register with an insulated contact strip 35 secured to the plate 30. A coil spring surrounding the shaft 31 at all times tends to maintain the arm 34 in contact with the contact strip 35. The arm 32 projects forwardly from the shaft 31 into the path of an auxiliary pointer 36 connected with the pointer 14 to rotate therewith. The arm 32 consists of two parts, 37 and 38 (see Fig. 7), and part 38 is pivotally secured to the part 37 at the point 39 by means of a supporting plate 40, and the parts are so arranged that motion of the part 38 relative to the part 37 can occur in one direction only and against the resistance of a spring 41. When the arm 32 is pushed in the direction of the arrow through contact with the pointer 36 the arms attached to the shaft 31 will move as a whole against the resistance of the spring 42 and will separate the arm 34 and the contact strip 35 and open the circuit, whereas if the arm 32 is pushed in the reverse direction of the arrow the part 38 will move on the pivot 39 and permit the pointer 36 to pass it readily. The entire movable member of the circuit breaker comprising the shaft 31, arms 32, 33 and 34 is very carefully balanced in all position by a suitable weight secured to the arm 33. Supporting bracket 43 is adjustably secured to the plate 30 by screws 44 passing through the slots 45.

A plate 50 is secured to the casing 1 and upon it is pivotally mounted a printing hammer 52 secured to a shaft 53. To the printing hammer hub is attached an armature 54, and a magnet 55 is mounted upon the plate 50 in a suitable position to engage the armature 54 and hold the hammer away from the type wheel against the resistance of a coil spring 56 which tends to force the hammer toward the type wheel. In the circuit of the magnet 55 is included a circuit breaker 57 consisting of two leaves 58 and 59 supported by an insulating block 60 and which are pressed together so as to touch and close the circuit whenever the armature 54 is in contact with the magnet 55, an insulating block 61 being arranged to prevent grounding of the circuit. In order to carry this circuit to the rotating circuit breaker 27 a contact finger 62 is mounted upon a block of insulation 63 attached to the bracket 17 and registers and contacts with a contact ring 64 secured to the type wheel 16. This contact ring is insulated from the type wheel 16 and is connected to the contact plate 35 of the circuit breaker, the other side of the circuit being grounded to the frame through the type wheel.

A circuit breaker 70 consisting of leaves 71 and 72 mounted upon an insulating block 73 secured to the plate 50 is closed by the motion of a rod 74 provided with an insulating tip 75 which will be pushed upward by the armature 54 as it moves into engagement with the magnet 55. The circuit breaker 70 is in the circuit of the motor 25 and its source of current and the motor will receive current only when this circuit breaker is closed.

Thus, the magnet circuit, as is illustrated in Fig. 11, consists of a source of electricity 200, wire 201, magnet 55, circuit breaker 57, wire 202, contact finger 62, contact ring 64, wire 203, circuit breaker 27, grounded upon the type wheel 16 by the wire 204, and return wire 205 to the source of electricity. The motor circuit consists in addition to the source of electricity of wire 207, circuit breaker 70, wire 208, motor 25, and return wire 209 to the source of electricity.

Figure 2:
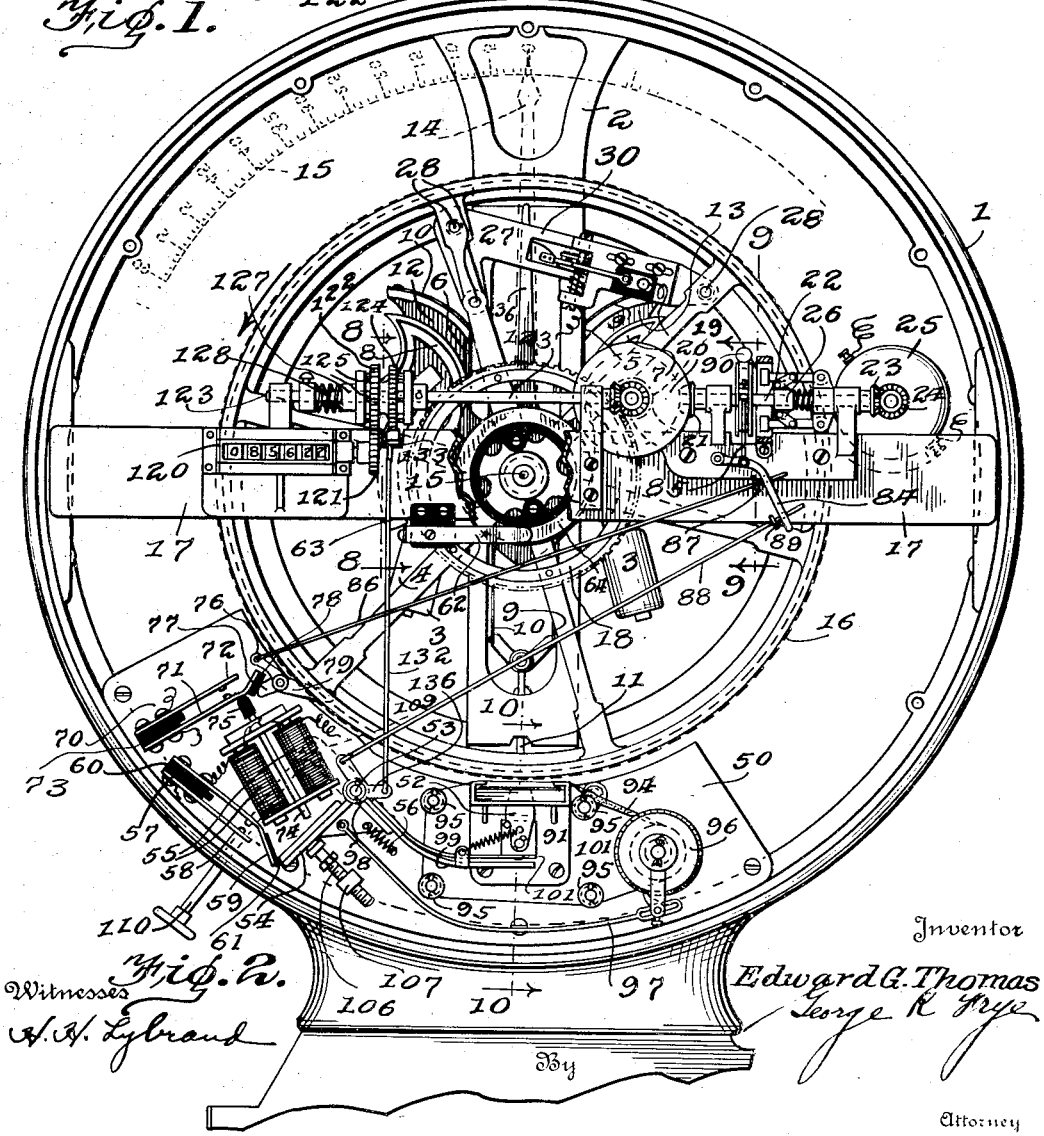
Fig. 2 is a rear elevation of the scale head with the casing removed.

The type wheel 16 carries a row of type along one side of its periphery, and against the other side of its periphery a bell crank lever 76 pivotally supported on the plate 50 is arranged to operatively register. The lever 76 has a projecting arm 77 which will engage the insulating block 78 secured to the leaf 71 of the circuit breaker 70 and will keep the circuit breaker 70 closed as long as the arm 79 of the bell crank lever 76 rides on the outer surface of that part of the periphery of the type wheel 16 which is not occupied by the figures. At a certain point in its periphery, however, an aperture 100 is cut, substantially as shown in Fig. 4, and at this point the arm 79 of the bell crank lever 76 will drop from the periphery of the type wheel 16 under the action of the spring tension of the leaf 71 which at all times tends to separate itself from leaf 72, and the circuit will be opened between the leaves 71 and 72, as is illustrated in Fig. 2, thus providing for stopping the motor at a desired point.

In order that the motor shall stop promptly when desired a brake mechanism is secured to the shaft 22 consisting of a brake drum 80 provided with a friction surface 81 keyed to the shaft 22. A brake shoe 82 is pivoted to a bracket 83 secured to the bracket 17. A curved lever 84 is pivotally mounted upon the bracket 17 and is connected to the brake shoe 82 by the link 85 in an adjustable manner. The arm 84 is connected to the bell crank 76 by a push rod 86 having an abutment 87 arranged to engage the arm 84. The arm 84 is similarly connected to the printing hammer 52 by a push rod 88 equipped with an abutment 89 adapted to engage the arm 84. These parts are so adjusted that when the armature 54 is in contact with magnet 55 the arm 84 will be forced to the right so as to lift the brake shoe 82 out of contact with the frictional surface 81, thus leaving the apparatus free from brake resistance, but upon the release of the printing hammer by the magnet 55 the push rod 88 will be withdrawn and the brake shoe 82 under the action of an attached weight 90 will drop into engagement with the frictional surface of the brake drum and bring the motor to rest unless the arm 84 is otherwise restrained from dropping down.

If the arm 79 of the bell crank 76 is riding upon the periphery of the type wheel 16 the push rod 86 will force the arm 84 to the right and lift the brake shoe 82 out of engagement, permitting it to drop, however, when the arm 79 drops into the gap 100 in the periphery of the type wheel, so that the brake will only be in operation and restrain the motion of the apparatus when the printing hammer shall have been released by the magnet and the bell crank 76 shall have dropped into the gap in the periphery of the type wheel.

A card holder 91 is located so as to present a card 92 placed therein to the type wheel for receiving a record. An opening 93 in the card holder permits the printing hammer to pass through it and force the card 92 upward against the type wheel to receive its impression. An inking ribbon 94 is guided by rollers 95 so as to pass between the type wheel and the card and cause a visible record to be impressed upon the card when it is forced against the type wheel. Containing reels 96 with feeding mechanism 97 are arranged for the reception of the ribbon and its movement.

The printing hammer 52 consists of a hub 98 with various projecting arms, to one of which is attached a curved member 99 and a spring member 101 secured to the member 99 only at a point close to the hub 98, conforming closely in contour to the member 99, in such a manner that members 99 and 101 tend to remain lightly in contact at their outer ends. A weight block 102 is secured to the spring member 101 and pivoted thereon is a printing member 103 connected by a tension spring 104 to the member 99 by which the printing member 103 is thrown against a stop 105 in the weight block 102. A suitable printing surface of rubber, felt or other yielding material 108 is attached to the printing member 103. An adjustable stop 106 is tapped into a boss 107 secured in the plate 50 against which the hub member to which the armature 54 is secured will strike when the armature is released and the printing hammer drawn backward by the spring 58. The adjustable character of the stop 106 permits accurate registration of the printing block 103 with the type wheel.

The shaft 53 of the printing hammer 52 is pivotally mounted in the bracket 50 and an arm 109 is secured adjacent its opposite end. A push rod 110 is yieldably secured to the arm 109 and passes outward through the scale head casing to an accessible position for the application of the hand in operating the lever.

The operation of this machine is as follows: A commodity of any sort is placed upon the load-receiver of the scale and in the usual manner the pointer of the scale will move to a position where it indicates the weight of the article to be weighed. The operator of the device will then force the push rod 110 inward as far as it will go, thereby retracting the printing hammer 52 against the force of the spring 58 and bringing its armature in contact with the magnet 55. This movement of the armature 54 closing the circuit of the magnet 55 will force leaves 58 and 59 together, thereby energizing the magnet and causing it to retain the armature 54. This motion of the armature 54 also will close the circuit breaker 70 and set the motor 25 into motion. The type wheel with the attached circuit breaker 27 will be rotated from the zero position of the apparatus through a complete circle, to be stopped at the zero position again in a manner to be now described. The circuit breaker 70 in the motor circuit is held in a closed position both by the engagement of the armature 54 with the rod 74 and by the bell crank lever 76. The gap 100 in the periphery of the type wheel 16 is located at such a point that when the gap registers with the arm 79 of the bell crank 76 the circuit breaker 27 will be located just back of the zero position of the pointer of the scale. When the apparatus is started in operation the edge 11 of the gap 100 will meet the arm 79 and force the bell crank 76 into the position illustrated in Fig. 3, and bell crank 76 cannot return to its initial position until the type wheel has made a complete revolution and returned to a point where the arm 79 can drop into the gap 100. The circuit of the motor will therefore be closed irrespective of the action of the armature 54 and rod 74, which action, however, is necessary for starting up the motor and turning the apparatus until the arm 79 encounters edge 111 of gap 100 and rides upon the periphery of the type wheel.

As the type wheel 16 rotates it carries with it the circuit breaker 27 and eventually will rotate to a point where the arm 32 encounters the auxiliary pointer 36. The further rotation of the type wheel and circuit breaker will open the circuit between the arm 34 and contact plate 35, and inasmuch as this circuit breaker is made delicately and of very light material the opening of the circuit will occur practically at the moment of contact with the auxiliary pointer 36. The opening of the magnet circuit at this point will de-energize the magnet 55, armature 54 will be released, and under the action of the spring 56 the printing hammer will be rapidly rotated in a counter-clockwise direction as seen in Fig. 2, until it encounters the stop 106 which limits its motion in this direction. At this moment the printing surface 108 is just out of contact with the card 92, but the momentum of the weight block 102 and printing member 103 will bend the spring member 101 sufficiently to permit the weight block 102 and printing member 103 to rise vertically carrying the card 92 and ribbon 94 with them until the ribbon is forced against the type wheel 16, thereby impressing the record of the type wheel at the point of contact on the card 92 and securing a record of the location of the auxiliary pointer 36 and associated indicating pointer 14. By properly proportioning the strength of the spring member 101 and the mass of the weight block 102 and printing member 103 these parts will strike against the type wheel 16 with the force of a blow just suited to produce the desired impression of the type wheel upon the card. The spring member 101 will immediately retract the weight block 102 and attached parts until the spring member 101 is again in contact with the curved member 99 so that the time of contact between the printing parts and the type wheel will be only momentary. However, the type wheel 16 will at this time be in motion and in order to prevent translation of the type surface over that of the card during the time of contact the printing member 103 is hinged, as has been described, upon the weight block 102 and its upper surface 108 can therefore while in contact through the card with the type wheel 16 travel in the direction of the arrow the amount represented by the motion of the type wheel during the time of contact. As soon as these parts are drawn back by the spring member 101 the tension spring 104 will pull the printing member 103 back to its original position in contact with the stop 105 but by the use of this construction blurring of the record upon the card will be prevented.

Since the circuit of the motor remains closed after the printing hammer returns to its original position through the action of the bell-crank lever 76 of the circuit breaker 70 the type wheel 16 will continue in rotation until it approaches the zero position, when the arm 79 will drop into the gap 100 and permit the circuit breaker 70 to open, thus cutting off the supply of current to the motor and by withdrawing the push rod 86 will permit the brake shoe 82 to drop into place on the brake drum 80 and promptly stop the motor. The contact 27 is adjustably secured to the plate 30 by providing slots 45 through which the screws 44 pass in order that an accurate adjustment of the relation of the location of the contact arm 32 to the position of the type wheel may be made so as to print an amount corresponding exactly to the indication on the dial. If, for instance, the amount recorded on the card is greater than the amount indicated on the dial the contact can be moved forward so as to engage the auxiliary pointer 36 at a slightly earlier time in the rotation of the type wheel whereby a smaller amount will be printed upon the card, or if the reverse is true and the amount printed on the card is less than that indicated the contact may be drawn back so as to engage the arm 36 a little later in the revolution of the type wheel, which will result in a larger amount being printed on the card, since the type wheel will have turned to a greater amount before the printing action took place.

In order to totalize the succession of a series of printing operations a counter 120 is mounted upon the bracket 17 and is driven by means of a gear 121 meshing with a gear 122 frictionally driven from a shaft 123 which is geared by miter gears 124 mounted upon the shaft carrying the bevel wheel 20, the ratio of the gearing being such that a motion of the type wheel 16 representing one unit of weight will move the counter one unit. The gear 122 is secured to a ratchet 124. These parts as a whole run free upon the shaft 123 but are driven through friction blocks 125 secured in the fixed spider 126 and sliding spider 127 which is pressed toward the gear 122 by a spring 128. A pawl 129 is pivoted at 130 to a bracket 131 secured to the bracket 17, the location of the pawl being such as to permit it to come into operative relation with the ratchet 124. A rod 132 having an abutment 133 passes through the pawl 129. A spring 134 is placed on the rod 132 above the pawl and the end of the rod is threaded and a nut 135 serves to create a pressure of the spring downward on the pawl 129. The lower end of the rod 132 is connected to an arm 136 secured to the hub of the printing hammer and the parts are so arranged that when the printing hammer is in its normal position against the stop 106 the abutment 133 on the rod 132 will press the pawl 129 firmly against the ratchet 124, thereby preventing its rotation, but when the printing hammer is in contact with and retained by the magnet 55 the abutment 133 will be withdrawn and the spring 134 will tend to release the pawl 129 from the teeth of the ratchet 124, permitting its rotation. An adjustable stop 137 is mounted in the pawl 129 to regulate the lowest position which it may occupy.

The pawl 129 is in the form of a bellcrank lever and a stiff flat spring 138 is secured to the member 139 thereof. A cam 140 is adjustably secured to one of the arms of the type wheel, as is shown in Fig. 5, by means of a plate 141 screwed to the arm of the type wheel. The spring 138 and cam 140 occupy positions whereby they are relatively operative. When the spring 138 is in engagement with the top surface of the cam 140, as is illustrated in Fig. 8, the pawl 129 is held into engagement with the teeth of the ratchet 124 irrespective of the position of the rod 132, but after further progress of the cam 140 in the direction of the arrow the spring 138 will drop out of engagement with it, permitting the pawl 129 to drop downward out of engagement with the teeth of the ratchet if at the same time the rod 132 has been drawn downward by the setting of the printing hammer into engagement with its magnet 55.

The purpose of the latter device is to insure that motion of the printing counter shall begin only at that point in the rotation of the type wheel 16 which represents a true zero position. Inasmuch as it cannot be assured that the motor 25 will always stop at exactly the same point the apparatus is arranged to stop a short distance back of the true zero position. If the pawl 129 was released at the moment of setting the printing hammer it is obvious that some motion in the counter 120 might occur before the type wheel passed its true zero position, and since the motion of the counter 120 will not be stopped until the printing action has taken place it is obvious that the reading of the counter would be greater than a true reading. The cam 140 is therefore set at such a position that the spring 138 is in contact with the top surface of the cam, preventing the rotation of the ratchet until the type wheel reaches a true zero position. The cam is set so that at this position it passes out of engagement with the spring 138, permitting the motion of the ratchet 124 and counter 120 to begin at the exact zero position of the type wheel, thus insuring that the record of the counter shall exactly agree with the reading of the card.

While it will be apparent that the illustrated embodiment of my invention herein disclosed is well calculated to adequately fulfill the objects and advantages primarily set forth, it is to be understood that my invention is susceptible to variation, modification and change without departing from the spirit and scope of the invention as set forth in the subjoined claims.

Having described my invention, I claim:

1. In a recording scale, the combination of a scale including a member positionable in accordance with the weight on the scale, a spring-propelled printing hammer, electrical means for retaining the printing hammer in inoperative position, a circuit breaker in the circuit of said electrical means adapted to move in a line parallel to the line of motion of said member and having a part projecting into the path thereof, a type-carrying device moving with the circuit breaker and adapted for cooperation with said hammer, and means for imparting motion to said circuit breaker.

2. In a recording scale, the combination of a scale mechanism including a weight-indicating member, a printing hammer, electrical means for retaining the printing hammer in inoperative position, a circuit breaker arranged to move in a path parallel to that of said weight-indicating member and having a part projecting into the path thereof, a type-carrying device moving with the circuit breaker and adapted for cooperation with said hammer, and means for imparting motion to said circuit breaker.

3. In a recording scale, the combination of a scale mechanism including a weight-indicating member, a type-carrying device, a printing hammer therefor, means for operating said hammer, electrical means for controlling the action of said means, including a circuit breaker arranged to move in a line parallel to the path of said weight-indicating member, and having a part projecting into the path of said indicating member, and means for imparting related motion to said type-carrying device and said circuit breaker.

4. In a recording scale, the combination of a weighing mechanism having a rotatable weight-indicating member, a type-carrying device, a printing hammer therefor, means for operating said hammer, electrical means for controlling the action of said operating means and including a circuit breaker arranged to rotate about an axis identical with that about which the weight-indicating member rotates and including two contact points, a member operatively attached to said circuit breaker and projecting into the path of said weight-indicating device and adapted to vary the relative rotation of said contact points, and means for imparting related motion to said type-carrying device and said circuit breaker.

5. In a recording scale, the combination with a scale having a rotatable indicating element, of a rotatable type-carrying member, a circuit breaker carried thereon and projecting into the path of said indicating element, an electrically controlled printing hammer mounted adjacent the type-carrying member, a circuit therefor controlled by said circuit breaker, and means for rotating the type-carrying member and circuit breaker through a full revolution when desired.

6. In a recording scale, the combination with a scale having a rotatable indicating element, of a rotatable type-carrying member, a circuit breaker carried thereon and projecting into the path of said indicating element, an electrically controlled printing hammer mounted adjacent the type-carrying member, a circuit therefor controlled by said circuit breaker, and electrically actuated means for rotating the type-carrying member and circuit breaker through a full revolution when desired.

7. In a recording scale, in combination, weighing mechanism including an element positionable in accordance with the weight on the scale, a recording mechanism cooperating therewith, said recording mechanism including a movable type-carrying member, a spring actuated printing hammer mounted adjacent thereto, electrically actuated means for holding the printing hammer out of engagement with the type-carrying member, and means for breaking the circuit of said electrically actuated means at a point in the movement of said type-carrying member determined by the position of said element.

8. In a recording scale, in combination, weighing mechanism including an element positionable in accordance with the weight on the scale, and recording mechanism cooperating therewith, said recording mechanism including a movable type-carrying member, a spring actuated printing hammer mounted adjacent thereto, electrically actuated means for holding the printing hammer out of engagement with the type-carrying member, and means mounted on the type-carrying member for breaking the circuit of said electrically actuated means at a point in the movement of said type-carrying member determined by the position of said element.

9. In a recording scale, in combination, weighing mechanism including an element positionable in accordance with the weight on the scale and recording mechanism cooperating therewith, said recording mechanism including a rotatable type-carrying member, a spring actuated printing hammer mounted adjacent thereto, electrically actuated means for holding the printing hammer out of engagement with the type-carrying member, and means mounted on the type-carrying member for breaking the circuit of said electrically actuated means at a point in the rotation of said type-carrying member determined by the position of said element.

10. In a recording scale, in combination, weighing mechanism including an element positionable in accordance with the weight on said scale and recording mechanism cooperating therewith, said recording mechanism including a type-wheel, a motor and connections for rotating the type-wheel, a printing hammer mounted adjacent the type-wheel, electrically actuated means for controlling the position of said hammer, a circuit connecting the motor and hammer control with a source of current, means for closing the circuit to energize the motor to effect one complete revolution of the type-wheel, and hold the printing hammer away from the type-wheel, and means for breaking the hammer control at a predetermined point during the revolution of said type-wheel.

11. In a recording scale, in combination, weighing mechanism including an element positionable in accordace with the weight on said scale, a type-wheel, means for rotating the type-wheel through a complete revolution, and means for effecting an impression while the type-wheel is in motion at a point in its revolution determined by the position of said element.

12. In a recording scale, in combination, weighing mechanism including an element positionable in accordance with the weight on said scale, a type-wheel, electrically actuated means for rotating the type-wheel through a complete revolution, and means for effecting an impression while the type-wheel is in motion at a point in its revolution determined by the position of said element.

EDWARD G. THOMAS.

Witnesses:
F. A. CROWLEY,
H. H. LEBRAND.